United States Patent [19]

Bronstein

[11] 4,386,773

[45] Jun. 7, 1983

[54] TV GAME CARTRIDGE WITH EXPANDABLE MEMORY

[76] Inventor: John M. Bronstein, 338 Lakelawn Blvd., Aurora, Ill. 60506

[21] Appl. No.: 275,935

[22] Filed: Jun. 22, 1981

[51] Int. Cl.³ .............................................. A63F 9/22
[52] U.S. Cl. ........................... 273/1 E; 273/DIG. 28; 340/799
[58] Field of Search ................. 273/1 E, 1 GC, 85 G, 273/237, DIG. 28; 340/723–726, 798, 799; 364/200, 410, 710, 900; 360/72.1, 74.4; 361/392, 395; 369/25, 28

[56] References Cited

U.S. PATENT DOCUMENTS

| | | | |
|---|---|---|---|
| 3,821,715 | 6/1974 | Hoff et al. | 307/238 X |
| 3,958,223 | 5/1976 | Cochran | 364/900 |
| 4,040,029 | 8/1977 | Young | 364/900 |
| 4,091,446 | 5/1978 | Demonte et al. | 364/200 |
| 4,180,805 | 12/1979 | Burson | 273/85 G |
| 4,191,996 | 3/1980 | Chesley | 364/200 |
| 4,232,374 | 11/1980 | Chung et al. | 273/85 G |
| 4,321,635 | 3/1982 | Tsuyuguchi | 360/74.4 |

OTHER PUBLICATIONS

*Designing with Microprocessors;* Texas Instruments Learning Center; 1975; pp. 28–29.

*Primary Examiner*—Vance Y. Hum
*Attorney, Agent, or Firm*—David C. White

[57] ABSTRACT

The present invention relates to a memory expansion device for use in increasing the ROM and adding RAM to a program cartridge. The program cartridge is used in association with electronic video games. The present invention relates to various electronic circuitry, including certain logic elements and ROM and RAM, allowing expansion of the memory without increasing or changing the number of conductor contact ribbons formed in parallel for interfacing the cartridge directly to the bus connector of the electronic video game.

3 Claims, 3 Drawing Figures

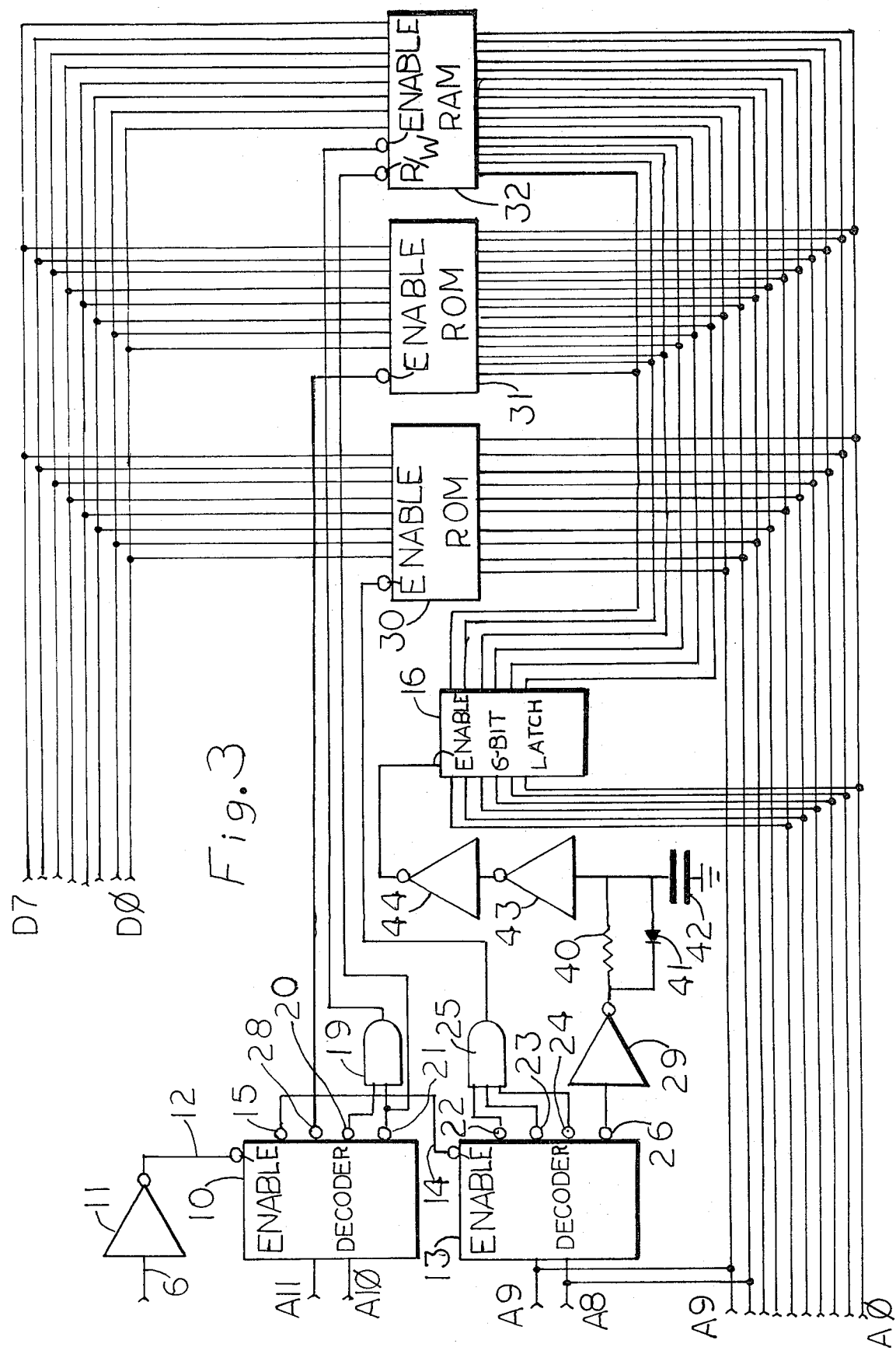

TV GAME CARTRIDGE WITH EXPANDABLE MEMORY

BACKGROUND OF THE INVENTION

The present invention relates to a memory expansion device for use in increasing the ROM and adding RAM to a program cartridge. The program cartridge is used in association with electronic video games. The present invention relates to various electronic circuitry, including certain logic elements and ROM and RAM, allowing expansion of the memory without increasing or changing the number of conductor contact ribbons formed in parallel for interfacing the cartridge directly to the bus connector of the electronic video game.

The basic art to which the present invention relates is only a few years old. The video games using program cartridges are commercially available, and have been mass marketed at an astonishing rate.

Many television connected microprocessor systems, for use as video games or educational systems, are designed to accept programs from interchangeable cartridges. A program is stored in the ROM of each cartridge. The number of memory addresses available in the cartridges is limited by the number of contact ribbons used in interfacing the cartridge to the video game base unit, and in some cases, the video game base unit does not provide a control line to utilize RAM in a cartridge, so no enable write signal can be interfaced with the cartridge electronic circuit elements. The present invention overcomes these problems of increasing the memory size and adding RAM without modifing the base unit or the bus connector of the base unit.

OBJECTS AND SUMMARY OF THE INVENTION

An object of this invention is to provide a microprocessor based video game that gives the user a wider choice of game and user programs as a result of increased memory size.

Another object of this invention is to provide a microprocessor based video game with a programable cartridge that provides the user with a programable cartridge including both ROM and RAM.

Another object of this invention is to provide a microprocessor based video game with a programable cartridge that provides additional memory space without modifying the base unit or the bus connector of the base unit.

In accordance with the above objects there is provided a programable cartridge for use in association with eletronic video games. The cartridge contains ROM and RAM storage devices and certain logic elements allowing the expansion of the memory without increasing or changing the number of conductor contact ribbons formed in parallel for interfacing the programable cartridge to the bus connector of the electronic video game.

BRIEF DESCRIPTION OF THE DRAWINGS

Still further objects and advantages of the invention will be apparent from the detailed description and claims when read in conjunction with the accompanying drawings.

FIG. 3 is a circuit diagram of the programable cartridge elements.

DESCRIPTION OF THE PREFERRED EMBODIMENT

Figure 1:
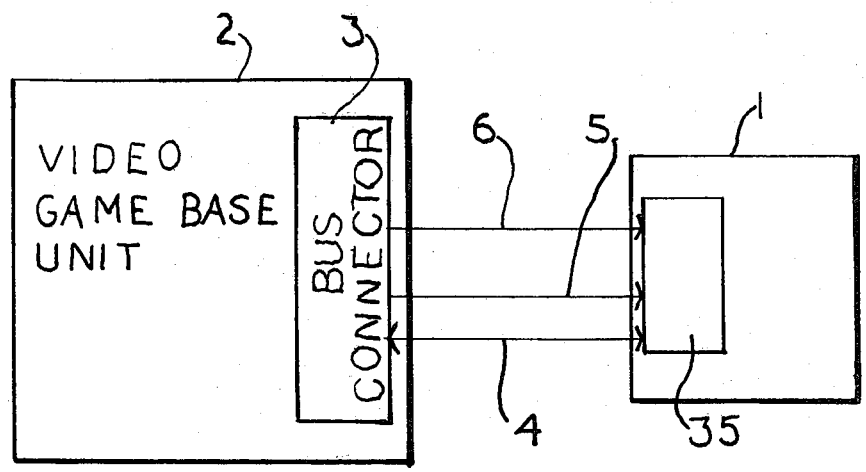
FIG. 1 is a block diagram of the video game base unit and the programable cartridge.

Referring first to FIG. 1, a block diagram illustrates the programmable cartridge elements 1, the video game base unit 2, the bus connector 3, and the cartridge plug 35. The data bus 4 is a bidirectional bus having eight lines D0 through D7 via which information is transferred from the base unit 2, to the programable cartridge elements 1, and via which information is transferred from the cartridge elements 1, to the base unit 2. The address bus 5 is an unidirectional bus having twelve lines, A0 through A11, along which addresses and control signals are transferred from the base unit 2 to the programable cartridge elements 1. A unilateral control bus 6, having one enable line, is used to enable a decoder 10, one of the cartridge elements.

Figure 2:
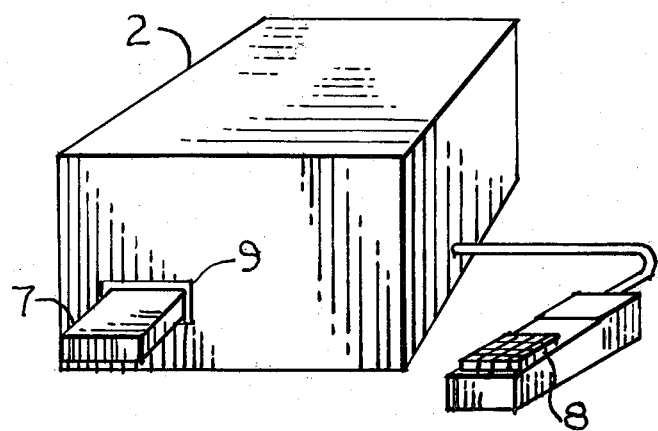
FIG. 2 is a perspective illustration of the video game base unit and the programable cartridge.

Referring to FIG. 2, the video game base unit 2 is designed to accept programs from cartridges 7 that are interchangeable. The cartridge 7 locks in place in a base unit socket 9 included in the base unit 2. The cartridge 7 utilizes ROM and RAM, and the user may enter his own program by way of a keyboard 8.

FIG. 3 shows a circuit diagram for the programable cartridge elements 1. The first 2-line-to-4-line decoder 10 can decode two bit input codes on the address bus lines A10 and A11. A signal on the control bus 6 is applied to an inverter 11, and the output of the inverter 11 is directly coupled by a single control line 12 to an inverted enable of the first 2-line-to-4-line decoder 10.

A second 2-line-to-4-line decoder 13 can decode two bit input codes on the address lines A8 and A9. A control line 14 couples the output 15 of the first decoder 10 to the inverted enable input of the second decoder 13. The output lines from the decoder 13 and the output lines from the decoder 10 are used as control lines.

The output 21 of the decoder 10 is coupled to the inverted write enable of RAM 32. The outputs 20 and 21 of decoder 10 are coupled directly to the inputs of a two input AND gate 19. The output of the AND gate 19 is coupled to the inverted enable of RAM 32. The output 28 of the decoder 10 is coupled to the inverted enable of ROM 31.

The output 26 of decoder 13 is coupled to a second inverter 29. The output of the second inverter 29 is coupled to a pulse shaper to exclude switching transients, consisting of resistor 40, switching diode 41, capacitor 42, and two inverters 43 and 44. The resistor 40 and the capacitor 42 filter out transients by first charging capacitor 42 during the transient, and second discharging the capacitor 42 through the switching diode 41. The two inverters 43 and 44 are used as a buffer. The output of inverter 44 is coupled to the enable input of the 6 bit latch 16. The outputs 22, 23, and 24 of the decoder 13 are separately coupled to the inputs of a three input AND gate 25. The output of AND gate 25 is directly coupled to the inverted enable of ROM 30.

Each of the ten address bus lines A0 through A9 are separately coupled to the ROM 30, and the ROM 31, and the RAM 32. The six address lines A0 through A5 are separately coupled to the inputs of the 6 bit latch 16. The latch 16 is used to select one of up to 64 pages of 1024 bytes of ROM or RAM. When the latch 16 is enabled, the address lines A0 through A5 are used to select a page. The outputs of the latch 16 are separately coupled to the RAM 32, and the ROM 31.

Data lines D0 through D7 are coupled to the ROM 30, the ROM 31, and the RAM 32. The address lines A0 through A11, the enable line, and the data lines D0 through D7, are separately coupled to the conductor cantact ribbons formed in parallel, and located in the cartridge plug 35, for interfacing the cartridge directly to the bus connector 3 of the base unit 2.

In accordance with the invention, the address lines A0 through A11, and the enable line are all logic level High or "1" at the beginning of all programs. The microprocessor used in the preferred embodiment is a 6507, and the first instruction is taken from the starting address stored in ROM 30. When the RESET input of the microprocessor is activated, the address lines and the enable line are all High. The input to inverter 11 is High and the output of the inverter 11 is Low, enabling the first decoder 10.

Typical digital waveforms go between the levels of 0.0 V and +5 V. In practical systems the Low state, or logic 0 might be any voltage between 0.0 V and +0.8 V, and the High state, or logic 1 might range from +2 V to +5 V.

When the address lines A10 and A11 are High, the output 15 of decoder 10 is Low, and the outputs 28, 20, and 21 are High. The output 15 is connected to the inverted enable input of the second decoder 13, and the second decoder 13 is enabled, as shown in TABLE 1 below. The output 21 of the decoder 10 is High, therefor the inverted write enable is not enabled, and the RAM can only be read.

TABLE 1

| Input | | AND 19 Output | Output | | | |
|---|---|---|---|---|---|---|
| A10 | A11 | | ROM 31 | RAM 32 | Decoder 13 | R/W |
| 1 | 1 | 1 | — | — | Enable | R |
| 0 | 1 | 1 | Enable | — | — | R |
| 1 | 0 | 0 | — | Enable | — | R |
| 0 | 0 | 0 | — | Enable | — | W |

When address lines A8 and A9 are High the output 22 is Low, and the outputs 23, 24, and 26 are High for the decoder 13. As shown in TABLE 2 below, the three input AND gate 25, has one input Low and the output of the AND gate 25 is Low enabling ROM 30. The output 26 of the decoder 13 is High and the inverter 29 inverts the High input so that latch 16 is not enabled. Address lines A0 through A9 are High and the first address is selected from the ROM 30.

TABLE 2

| Input | | AND 25 Output | Output | |
|---|---|---|---|---|
| A8 | A9 | | ROM 30 | Latch 16 |
| 1 | 1 | 0 | Enable | — |
| 1 | 0 | 0 | Enable | — |
| 0 | 1 | 0 | Enable | — |
| 0 | 0 | 1 | — | Enable |

The address decoding logic is divided into five regions of different functions. The address lines A0 through A11 can be coded in binary or Hexadecimal. The addresses and operations are shown in the TABLE 3 below.

TABLE 3

| ADDRESS LINE | | | | | | | | | | | | HEX | OPERATION |
|---|---|---|---|---|---|---|---|---|---|---|---|---|---|
| A0 | A1 | A2 | A3 | A4 | A5 | A6 | A7 | A8 | A9 | A10 | A11 | | |
| 0 | 0 | 0 | 0 | 0 | 0 | 0 | 0 | 1 | 0 | 1 | 1 | D00 to | Read ROM 30. RESET at FFF. |
| 1 | 1 | 1 | 1 | 1 | 1 | 1 | 1 | 1 | 1 | 1 | 1 | FFF | |
| 0 | 0 | 0 | 0 | 0 | 0 | 0 | 0 | 0 | 0 | 1 | 1 | C00 to | Latch A0 through A5 to select one |
| 1 | 1 | 1 | 1 | 1 | 1 | 0 | 0 | 0 | 0 | 1 | 1 | C3F | of any mixture of ROM or RAM. Appropriate decoding allows eight pages of ROM and RAM to be selected independently. |
| 0 | 0 | 0 | 0 | 0 | 0 | 0 | 0 | 0 | 0 | 0 | 1 | 800 to | Read selected word of 1024 |
| 1 | 1 | 1 | 1 | 1 | 1 | 1 | 1 | 1 | 1 | 0 | 1 | BFF | byte page of ROM. The page is selected by decoding the latch 16. |
| 0 | 0 | 0 | 0 | 0 | 0 | 0 | 0 | 0 | 0 | 1 | 0 | 400 to | Read a selected word of 1024 byte |
| 1 | 1 | 1 | 1 | 1 | 1 | 1 | 1 | 1 | 1 | 1 | 0 | 7FF | page of RAM. The page is selected by decoding the latch 16. |
| 0 | 0 | 0 | 0 | 0 | 0 | 0 | 0 | 0 | 0 | 0 | 0 | 000 to | Write a selected word of 1024 |
| 1 | 1 | 1 | 1 | 1 | 1 | 1 | 1 | 1 | 1 | 0 | 0 | 3FF | byte page of RAM. The page is selected by decoding the latch 16. |

Words describing the logic functions performed by the circuit elements should be given their broadest generic meaning. Different implementations of the present invention can be discerned easily by those skilled in the art. Inasmuch as the present invention is subject to many variations, it is intended that the foregoing description shall be interpreted as illustrative and not in a limiting sense.

I claim:

1. A memory expansion device for use in increasing ROM and adding RAM to a program cartridge without increasing or changing a number of conductor contact ribbons formed in parallel for interfacing the cartridge directly to a bus connector of an electronic video game, the cartridge comprising:

a first decoder to decode input codes on a plurality of address lines, output signals on a plurality of control lines an inverted enable input;

a second decoder to decode input codes on a plurality of address lines, to output signals on a plurality of control lines, and having an inverted enable input;

means for coupling an inverted enable input of the second decoder to one of the plurality of control lines of the first decoder;

a first inverter coupled from one of the conductor contact ribbons providing control signals to an inverted enable input of the first decoder;

a first AND gate having an output and a plurality of inputs, the plurality of inputs being separately coupled to the plurality of control lines of the first decoder not used to enable the second decoder and not used to enable a second ROM;

a RAM having an inverted enable coupled to an output of the first AND gate, a R/W input, and a plurality of address inputs;

means for coupling one of the plurality of inputs of the first AND gate to a R/W input of the RAM;

a second ROM having an inverted enable coupled directly to a control line of the first decoder, and a plurality of address inputs;

a pulse shaper directly coupled to a control line of the second decoder and having an output;

a plurality of latches having a common enable coupled to the pulse shaper;

a second AND gate having a plurality of inputs separately coupled to the control lines of the second decoder not coupled to the shaper;

a first ROM having an inverted enable coupled to an output of the second AND gate, and a plurality of address inputs;

a plurality of address lines each separately coupled from the conductor contact ribbons not used to provide control signals to the first inverter to the first ROM;

means for separately coupling each of the plurality of address lines from the first ROM to the second ROM;

means for separately coupling each of the plurality of address lines from the first ROM to the RAM;

means for separately coupling one or more, but not all of the address lines coupled to the first ROM to the inputs of the plurality of the latches, one address line coupled to only one of the latch inputs;

means for separately coupling the outputs of each of the plurality of latches to the second ROM address inputs;

means to separately couple the outputs of each of the plurality of latches to the RAM address inputs;

a plurality of data lines each separately coupled from the conductor ribbons not used to provide control signals to the first inverter, and not used to supply signals to the first and second decoder, and not used to supply address signals to the RAM, the first ROM and the second ROM, to the data inputs of the first ROM;

means for separately coupling the plurality of data lines from the first ROM to the second ROM;

and means for separately coupling the plurality of data lines from the second ROM to the RAM.

2. The memory expansion device for use in increasing ROM and adding RAM in accordance with claim 1 wherein the smaller ranges of the address inputs on the cartridge interface comprises:

a first range of addresses, including the video game microprocessor's reset address which enables the ROM for read operations regardless of the contents of the multi-bit latch;

a second range of addresses which enable the multi-bit latch and cause it to latch and hold the logic levels present on the cartridge interface bus lines to which the multi-bit latch inputs are connected, and the latch holds these logic levels until the latch receives a new enable input;

a third range of addresses which enable the ROM for a read operation, with the actual address presented to the ROM comprising the low order address lines of the cartridge interface bus and the output from the multi-bit latch, thus extending the addresses available for the ROM;

a fourth range of addresses which enable the RAM a read operation, with the address presented to the RAM comprising the low order address lines of the cartridge interface bus and the output from the multi-bit latch, thus extending the addresses available for the RAM; and a fifth range of addresses which enable the RAM for a write operation, with the address presented to the RAM comprising the low order address lines of the cartridge interface bus as well as outputs from the multi-bit latch, thus extending the addresses available for the RAM as well as providing the write enable input to the RAM which is missing from the cartridge interface bus.

3. A memory expansion device for use in increasing ROM and adding RAM to a program cartridge without increasing or changing a number of conductor contact ribbons formed in parallel for interfacing the cartridge directly to a bus connector of an electronic video game, the conductor contact ribbon interfacing the cartridge to the electronic video game having no RAM write enable signal line from the video game unit to the cartridge, comprising:

a ROM containing a program and its starting address suitable for controlling a microprocessor in the video game unit, and having low order address lines, high order address lines, data lines, and an enable input;

a RAM having data lines and low order address lines connected in parallel with the equivalent lines of the cartridge interface bus and the ROM, and having high order address lines and enable inputs;

a multi-bit latch having an enable input, outputs connected to the upper order address lines of the ROM and the upper order address lines of the RAM, and having inputs connected to various input bus lines of the cartridge;

an address decoder having inputs which are connected to the upper order address lines of the cartridge, and having outputs enabled by an enable signal from the cartridge input bus, the outputs of the address decoder are each connected separately to the enable input of the ROM, to the enable inputs of the RAM, and to the enable input of the multi-bit latch, and the outputs of the address decoder are, when enabled, determined by logical combinations of the address bits presented to the inputs in such a way as to divide the range of possible address inputs to the cartridge interface into several smaller ranges;

a first pulse shaper connected between the output of the address decoder and the enable input of the multi-bit latch for rejecting logic transients occuring during the propagation of the transition of the address lines of the cartridge interface bus through the address decoder logic, thus avoiding false enables of the multi-bit latch; and a second pulse shaper connected between the output of the address decoder and the write enable input of the RAM to reject logic transients occuring during the propagation of the transition of the address lines of the cartridge interface bus through the address decoder logic, thus avoiding false write enables of the RAM, and also to provide signal delay and pulse length limiting necessary to match the timing of the enable and period of valid data.

* * * * *